July 22, 1952  E. N. JACOBI  2,604,554
ELECTRICAL SWITCH
Filed Oct. 24, 1949  2 SHEETS—SHEET 1
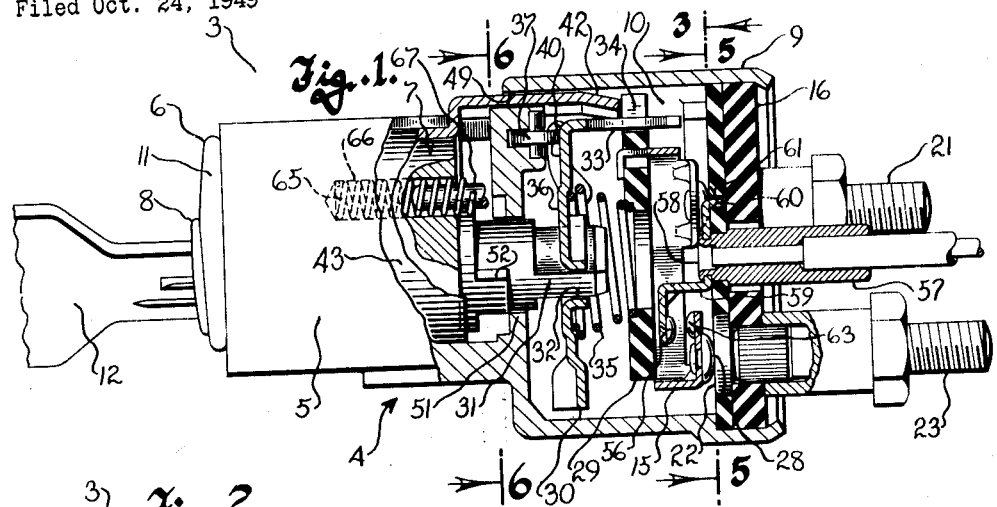
Fig. 1.
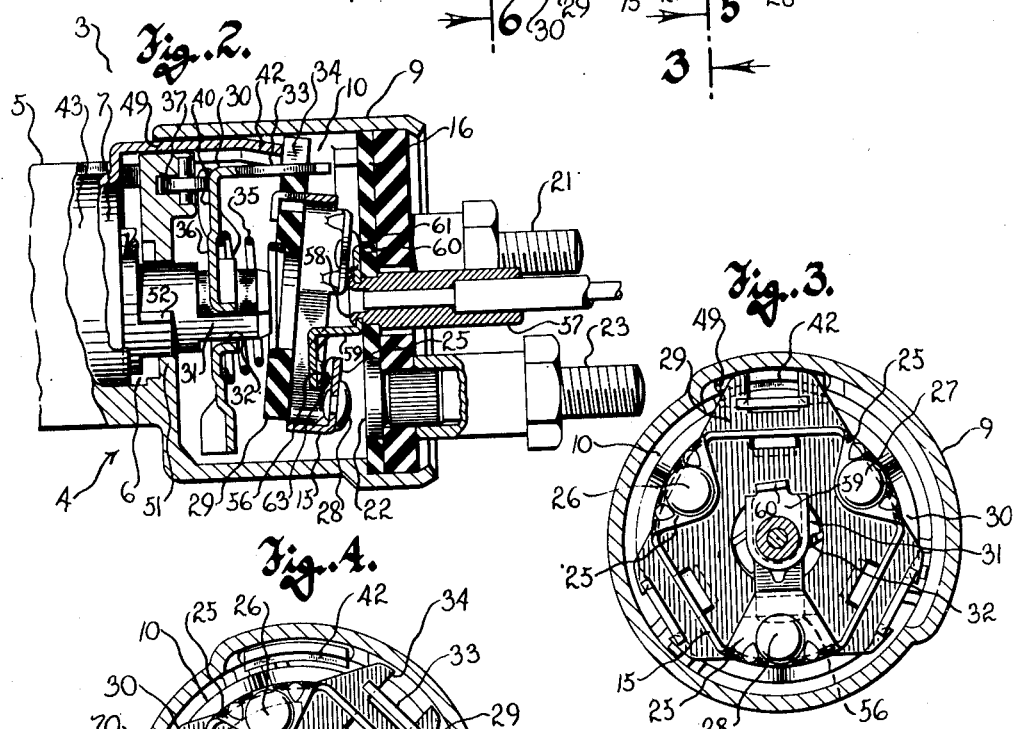
Fig. 2.
Fig. 3.
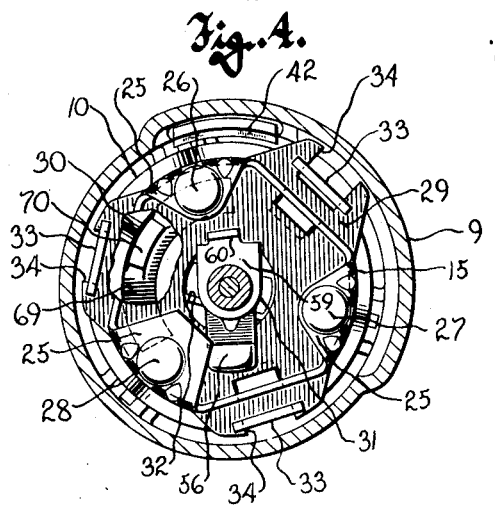
Fig. 4.
Inventor
Edward N. Jacobi July 22, 1952     E. N. JACOBI     2,604,554
ELECTRICAL SWITCH
Filed Oct. 24, 1949     2 SHEETS—SHEET 2
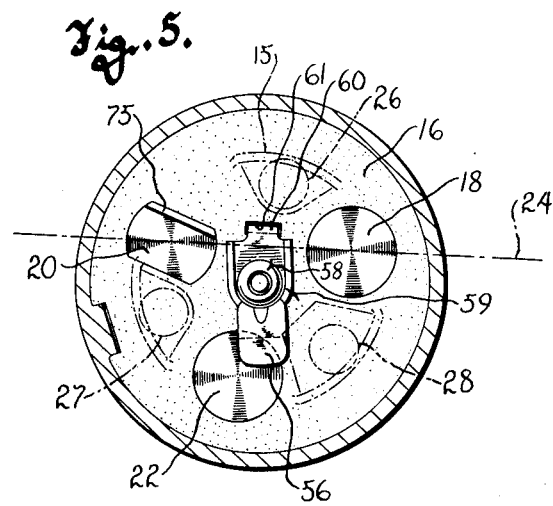
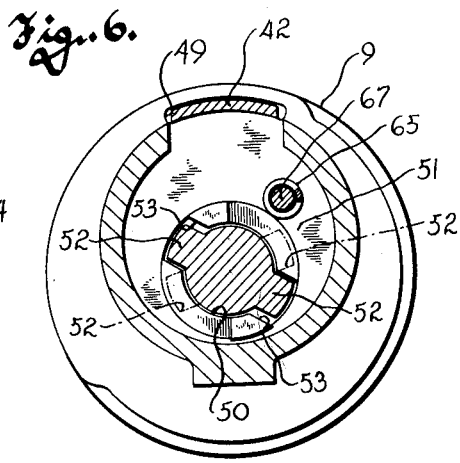
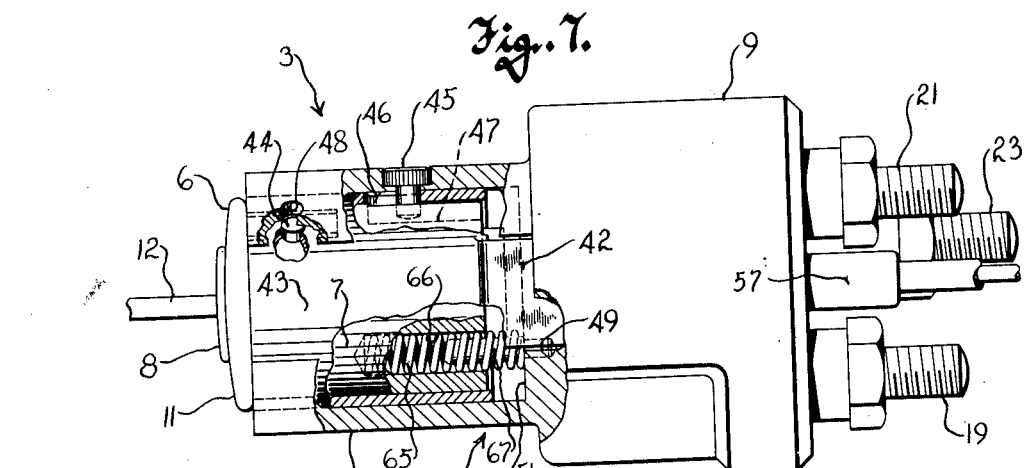
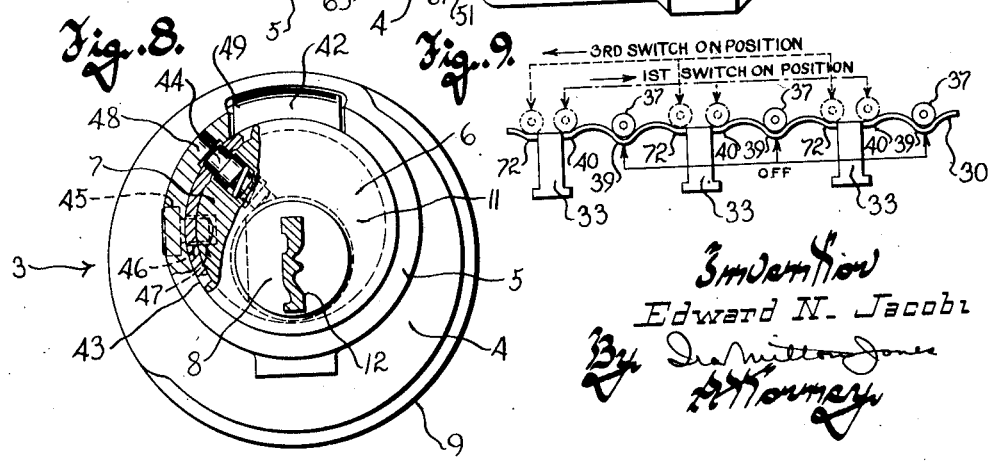
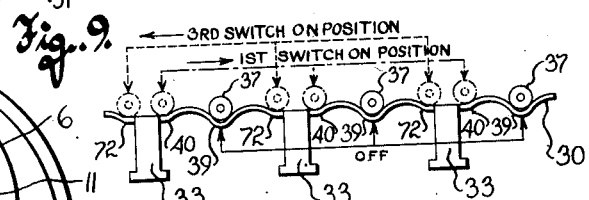
Inventor
Edward N. Jacobi Patented July 22, 1952

2,604,554

UNITED STATES PATENT OFFICE 2,604,554

ELECTRICAL SWITCH

Edward N. Jacobi, Milwaukee, Wis., assignor to Briggs & Stratton Corporation, Milwaukee, Wis., a corporation of Delaware Application October 24, 1949, Serial No. 123,279

14 Claims. (Cl. 200—4)

This invention relates to electric switches and has more particular reference to ignition switches for automotive vehicles.

The primary object of this invention resides in the provision of an ignition switch for automobiles and similar vehicles to control not only the ignition circuit of the automobile but to enable control of the starter and accessory circuits as well.

More specifically this invention has as its object the provision of a switch of the character described having a contactor which is movable from an off position to a first switch on position rendering the ignition and accessory circuits operative, and which contactor is movable to a second switch on position rendering the ignition and starter circuits operative and the accessory circuit inoperative.

Hence it will be seen that one of the features of the switch of this invention resides in the fact that the starting circuit is completed only when the circuit controlling the accessories of the vehicle is broken, so that the full power of the battery of the vehicle is available for starting.

Another object of this invention resides in the provision of a multi-purpose switch of the character described which is operated by a single rotatable and endwise slidable actuator.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which:

Figure 1 is a view partly in side elevation and partly in longitudinal section illustrating the switch of this invention in its first on position;

Figure 2 is a fragmentary view of a portion of the switch shown in Figure 1 but illustrating the switch in its second on position;

Figure 3 is a cross sectional view taken through Figure 1 along the plane of the line 3—3;

Figure 4 is a view similar to Figure 3 but illustrating the contactor of the switch in its off position;

Figure 5 is a cross sectional view taken through Figure 1 along the plane of the line 5—5;

Figure 6 is a cross sectional view taken through Figure 1 along the plane of the line 6—6;

Figure 7 is a view similar to Figure 1 but viewing the switch from the top;

Figure 8 is a front elevational view of the switch with portions thereof broken away and shown in section; and Figure 9 is a view diagrammatically illustrating the detent means for defining the various positions of the switch.

Referring now to the accompanying drawings the numeral 3 generally designates a locking ignition switch of the type forming the subject matter of Patent No. 2,440,690, issued May 4, 1948, to Edward N. Jacobi, and similar to the switch shown and described in the copending application of Edward N. Jacobi, Serial No. 19,529, filed April 7, 1948.

Like the afore-mentioned patent and application, the switch here shown is of the type which is adapted to be mounted on the instrument panel of an automobile or other internal combustion engined powered vehicle. The switch comprises a body or housing 4 having a small diameter front end 5 bored to slidably receive lock mechanism 6 including a casing 7 and a key controlled lock cylinder 8 rotatable in the casing 7. The housing is enlarged at its rear end portion as at 9, to provide a switch case containing the switch instrumentalities generally designated 10.

The lock switch is adapted to be mounted on the instrument panel of a vehicle with the front 11 of the lock mechanism accessible to the operator of the vehicle through a hole in the instrument panel (not shown) and with the remainder of the switch disposed behind the panel. The lock cylinder may be of a conventional type similar to those of the afore-mentioned patent and copending application, and is operated by means of the usual key 12 insertable into the front end of the lock cylinder to free the lock cylinder for rotation.

The switch of this invention is in off position when the lock cylinder occupies the position of rotation shown in Figures 4, 7, and 8; and has a contactor 15 connected with the lock cylinder to rotate therewith across the inner face of a terminal head 16 closing the rear of the switch case. Rotation of the contactor to a first switch on position shown in Figures 1, 3, and 6 renders the ignition and accessory circuits of the vehicle operative in a manner now about to be described.

For this purpose three stationary contacts are embedded in the terminal plate and have their contact faces exposed at the inner surface of the terminal head substantially flush therewith.

One of these contacts 18 is electrically connected with the battery or supply terminal 19; a second contact 20 is electrically connected with the ignition terminal 21; and the third contact 22 is electrically connected with an auxiliary or accessory terminal 23. All of these terminals project from the back of the case to provide for connecting battery, ignition and accessory leads, respectively, thereto. All of the accessories of the vehicle, such as the heater, radio, and gauge, are adapted to have their circuits controlled by the switch of this invention and hence the leads of these accessories are all connected with the auxiliary terminal 23.

As shown best in Figure 5, the stationary supply and ignition contacts 18 and 20, respectively, are located on the terminal head on a substantially horizontal line 24 slightly above the center of the switch case, and these contacts are spaced apart laterally from one another. The third stationary contact 22 is located on the terminal head a distance beneath the line 24 and more or less centrally of the contacts 18 and 20. It will also be noted that the contacts 18, 20, and 22 are substantially equi-distant from the center of the switch case.

The rotatable bridging contactor 15 of the switch is a spider-like stamping of thin sheet brass and is similar to the contactor shown and described in the afore-mentioned copending application of Edward N. Jacobi. The contactor is generally of hexagonal outline, as seen best in Figures 3 and 4, and ears 25 are bent inwardly from alternate flat sides of the contactor and have rearwardly projecting convex contact points 26, 27 and 28 thereon located to conform to the grouping of the stationary contacts 18, 20 and 22 for cooperation with said stationary contacts in a manner to be described shortly.

The contactor is fixed to a generally triangular insulating disc 29 which in turn has a splined driving connection with a coupling-like detent plate 30 forming part of the driving connection between the lock cylinder 11 and the contactor. This driving connection also includes an elongated axial driving lug 31 projecting rearwardly from the inner end of the lock cylinder into the switch case and slidably received in a substantially rectangular central hole 32 in the detent plate. Thus the detent plate has a splined connection with the lock cylinder as well as with the insulating disc, and while these splined connections are described at greater length in the afore-mentioned copending application, it should be noted that the connection between the detent plate and the insulating disc includes rearwardly projecting legs 33 on the plate projecting rearwardly through notches 34 in each of the corners of the substantially triangular insulating disc 29.

With the construction described the detent plate 30 serves as a coupling constraining the contactor 15 to rotate with the lock cylinder, while being free to slide axially in the switch case between the contactor and the inner end of the lock cylinder.

The contactor 15 is pressed rearwardly against the inner face of the terminal head 16 by means of a compression spring 35 confined between the body 36 of the detent plate and the insulating disc 29. This spring, therefore, serves to assure adequate contact pressure between the stationary contacts on the terminal head and the contact points of the contactor in the switch on positions of the contactor. The reaction of the compression spring is borne by the switch case, and as indicated best in Figures 1 and 2 it is to be noted that the detent plate is urged forwardly by the spring toward the lock cylinder and into engagement with the peripheries of a series of rollers 37 rotatably journalled in the bottom of the switch case. There are three of such rollers, as shown and described at greater length in the afore-mentioned copending application, and their engagement with the body of the detent plate determines its axial position in the switch case.

When the switch is in the off position, shown in Figures 7 and 8, the rollers 37 are seated in indentations 39 in the body of the detent plate and the compression spring cooperates with these indentations and the rollers to constitute detent means defining the off position of the switch. Also in the off position of the switch the contact points on the contactor are in their positions shown in Figure 4 and indicated in construction lines in Figure 5 so that each of them lies between two adjacent stationary contacts on the terminal head.

Upon rotation of the lock cylinder actuator in a clockwise direction, as viewed in Figures 5, 6, and 8, or counterclockwise as viewed in Figures 3 and 4, the contactor 15 is rotated to its first switch on position defined by the engagement of the rollers 37 in indentations 40 in the detent plate. In this first switch on position contact point 26 is engaged with the battery or supply contact 18; contact point 27 is brought into engagement with the ignition contact 20; and contact point 28 is engaged with the accessory contact 22. Thus, the ignition and accessory contacts 20 and 22, respectively, are electrically connected with the supply contact 18 by the contactor to render the ignition and auxiliary or accessory circuits of the automobile operative.

Again in this position of the contactor the compression spring 35 cooperates with the rollers 37 and the indentations in the detent plate 30 to constitute detent means which define said first switch on position of the switch.

Referring to Figure 3, it will be understood that the two upper contact points 26 and 27 of the contactor will be in engagement with the contacts 18 and 20 on the terminal head in the first switch on position; and one of the main features of the switch of this invention resides in the fact that in this position, the contactor may be tilted about an axis defined by the points of engagement between its points 26 and 27 and the stationary contacts 18 and 20, to carry the lower portion of the contactor forwardly away from the terminal head. When tilted to the position shown in Figure 2, therefore, the lower contact point 28 on the contactor is separated from the stationary auxiliary contact 22 to break the auxiliary or accessories circuits of the automobile. Figure 2 thus shows the second switch on position of the contactor, and as will be apparent, the compression spring 35 opposes such tilting of the contactor and tends to return it to its first on position.

Tilting of the contactor to its second on position is effected by inward depression of the lock mechanism, which in its entirety may be said to be a push button actuator for the switch. The connection between the lock mechanism and the contactor which effects tilting of the latter comprises a pusher finger 42 formed as a rearward extension on a sleeve 43 encircling the casing of the lock cylinder. This sleeve is pinned to the lock mechanism by means of an outwardly urged pin-like tumbler 44 shown best in Figure 8, and is constrained to axial sliding motion in the reduced front portion 5 of the housing by means of a pin 45 driven into the side of the housing to have its inner end pass into registering longitudinal slots 46 and 47 in the sleeve and the casing of the lock, respectively. The pin 45 thus not only holds the casing for the lock clyinder against rotation, but it also holds the sleeve against disassembly from the housing though permitting the sleeve and the lock cylinder and casing a limited degree of axial motion; while the spring urged pin or plunger 44 is depressible to retract it from its hole in the sleeve to enable disassembly of the lock cylinder and casing from the housing. For this purpose an access hole 48 is provided in the side wall of the forward portion 5 of the housing.

The finger 42 on the sleeve 43 enters a slot 49 in the bottom or front end of the switch case 9 and passes rearwardly inside the case close to its side wall to have its rear extremity in close juxtaposition to and in alignment with the apex of the insulating disc 29 which is disposed uppermost when the switch is actuated to its first switch on position.

In the off position of the switch, that is, when the lock cylinder has been rotated to its key inserting and withdrawing position, the push button defined by the lock mechanism and the sleeve 43 cannot be depressed axially rearwardly into the housing. This results from the fact that while the rear end of the lock cylinder projects through a hole 50 in the bottom wall 51 of the switch case, opposite radial lugs 52 on the inner end of the cylinder are out of alignment with respect to diametrically opposite notches 53 opening to the hole 50. These notches are wide enough to accommodate the lugs 52 but the lock cylinder must be rotated to carry the switch contactor to its first switch on position to align the lugs with the notches to enable the lock mechanism to be depressed inwardly and effect tilting of the contactor to its second switch on position.

As hereinbefore described the contactor is carried off of the stationary accessory contact 22 when tilted to the second switch on position shown in Figure 2. In this second switch on position, the contactor is adapted to maintain the ignition circuit operative since the upper contact points of the contactor remain engaged with the supply and ignition contacts 18 and 20, respectively. In addition, the contactor is adapted to complete an energizing circuit to the starter solenoid, not shown, in its second switch on position.

For this purpose, the switch has a fourth stationary contact 56 mounted on the terminal head 16 and electrically connected with a terminal 57 on the back of the switch case to which the lead of the starter solenoid is connected. The terminal 57 enters the center of the terminal head and has its inner end portion upset as at 58 to rivet the clip 59 which carries the contact 56 to the terminal head at the inner face thereof. This clip 59 has a tail portion 60 bent rearwardly therefrom and received in a recess 61 in the inner face of the terminal head to preclude rotation of the clip relative to the terminal head; and the contact 56 is located on a forwardly extending arm of the clip and a distance forwardly of the inner face of the terminal head nearly in line with the stationary accessory contact 22. As will be apparent, the contact 56 aligns with the lowermost ear 25 of the contactor when the latter is in is first switch on position.

Thus, upon tilting of the contactor to its second switch on position shown in Figure 2 the contact point 63 on the lowermost ear 25 of the contactor is brought into engagement with the stationary starter contact 56 so that the contactor electrically connects the starter contact with the supply contact 18 to complete the energizing circuit for the starter solenoid.

Obviously, the push button provided by the lock cylinder, its casing, and the sleeve 43 must be held depressed manually to maintain the starter circuit energized until the engine of the vehicle is started, at which time the push button may be released. Upon such release of the push button the compression spring 35 returns the contactor to its first switch on position shown in Figure 1, to break the starter solenoid circuit and to reestablish the accessory circuit in the manner hereinbefore described.

Inward depression of the push button is yieldingly resisted by a compression spring 65 seated in a well 66 leading into the casing of the lock mechanism from the rear thereof, the spring 65 bearing against the bottom wall 51 of the switch case. The projecting rear end of the spring 65 encircles a pin 67 fixed on the wall 51, and the pin projects forwardly far enough to extend a distance into the well 66 as seen best in Figures 1 and 7. Normally the spring 65 urges the lock mechanism or push button axially outwardly to bring the right-hand end of the slot 46 in the sleeve 43 into engagement with the pin 45 as shown in Figure 7.

During inward depression of the push button to effect tilting of the contactor to its ignition on starter on position the engagement of the contactor with the starter contact 56 limits the inward depression of the lock mechanism, the slot 46 in the sleeve 43 being long enough to prevent engagement of the left-hand end of the slot with the pin 45 at this time.

Rotation of the contactor is limited in the same manner as described in the aforementioned copending application of Edward N. Jacobi. Briefly, the rotation stops comprise an arcuate slot 69 in the body of the detent plate or coupling 30, and a pin or lug 70 projecting rearwardly from the bottom 51 of the switch case and engaged in the slot 69. The length of the slot 69 is such as to enable rotation of the contactor by the lock cylinder to its first switch on position and to assure engagement of the rollers 37 in the indents 40 of the cam plate.

Attention is directed to the fact that while the switch of this invention has been described as having a first and a second "on" position reached by first rotating the contactor in a clockwise direction, as viewed in Figures 6 and 8, it also has a third on position reached by rotating the contactor in a counterclockwise direction as viewed in Figures 6 and 8. In the third switch on position of the contactor, the accessory circuit alone is completed, and this position of the switch is defined by the engagement of the rollers 37 in indents 72 in the detent plate 30. In this switch on position, the two contact points 27 and 28 engage the stationary supply contact 18 and the accessory contact 22.

Obviously the slot 69 in the detent plate 30 has sufficient arcuate length to accommodate rotation of the contactor in the counterclockwise direction described to allow seating of the rollers 37 in the indents 72, but the pin 70 will not allow further counterclockwise rotation of the contact.

Referring to Figure 6 it will be noted that the diametrically opposite lugs 52 on the inner end of the lock cylinder are shown in construction lines in the off position of the switch corresponding to the key inserting and withdrawing position of the lock cylinder. Also in this view the full line position of the lugs 52 indicates the first on position of the switch seen in Figures 1 and 3, in which position the lugs 52 align with the notches in the bottom of the switch case to permit inward depression of the push button actuator and tilting of the contactor to its ignition on, starter on, accessories off position.

The third switch on position to connect only the accessory contact 22 with the supply contact 18 is reached by counterclockwise rotation of the lock cylinder to carry the lugs 52 from their construction line position shown in Figure 6 to bring the lugs to a vertical position. Also in the third switch on position it will be appreciated that the contact point 26 does not come into engagement with ignition contact 20, and to assure that such engagement therebetween will not take place the ignition contact is slabbed off and beveled at its upper edge as at 75.

From the foregoing description taken with the accompanying drawings it will be readily appreciated that this invention provides an ignition switch for automotive vehicles by which the starting and accessory circuits may be conveniently controlled.

What I claim as my invention is:

1. A combined ignition and starter switch for automotive vehicles, comprising the combination of: spaced apart stationary supply and ignition contacts; a movable contactor engageable with said supply and ignition contacts to electrically connect the same in a first switch on position of the contactor, said contactor being tiltable upon said supply and ignition contacts about an axis passing through the points of engagement between said contacts and the contactor, to a second switch on position; means acting on the contactor to yieldingly resist tilting thereof to said second switch on position; a starter contact fixed with respect to said supply and ignition contacts but spaced to one side of said axis and in position to be engaged by the contactor and electrically connected with the supply contact by said contactor when the latter is tilted to its second switch on position; and an actuator for imparting tilting motion to said contactor to carry the same from its first to its second switch on positions.

2. A combined ignition and starting switch for automotive vehicles, comprising the combination of: spaced apart stationary supply and ignition contacts; a contactor rotatable from a switch off position to a first switch on position engaging said supply and ignition contacts to electrically connect the same, said contactor being tiltable upon said supply and ignition contacts about an axis passing through the points of engagement between said contacts and the contactor, to a second switch on position; means acting on the contactor to yieldingly resist tilting thereof to said second switch on position; a starter contact fixed with respect to said supply and ignition contacts but spaced to one side of said axis and in position to be engaged by the contactor and electrically connected with the supply contact by said contactor when the latter is tilted to said second switch on position; and actuator means for imparting rotative and tilting movements to said contactor.

3. In a switch for controlling the ignition, accessory and starting circuits of an automotive vehicle, the combination of: spaced apart stationary supply and ignition contacts; a stationary accessory contact adjacent to said supply and ignition contacts but spaced a distance to one side of a line joining the contact faces thereof; a movable contactor engageable with said supply, ignition, and accessory contacts to electrically connect the same in a first switch on position of the contactor, said contactor being tiltable upon the contact faces of said supply and ignition contacts about an axis passing through the points of engagement between said contacts and the contactor, to a second switch on position in which the contactor is disengaged from the accessory contact but remains in engagement with the supply and ignition contacts; means acting on the contactor to yieldingly resist tilting thereof to said second switch on position; a starter contact fixed with respect to the remaining contacts but spaced to one side of said axis and in position to be engaged by the contactor and electrically connected with the supply contact by said contactor when the latter is tilted to said second switch on position; and an actuator connected with said contactor for tilting the same from its first to its second switch on position.

4. In a switch for controlling the ignition, accessory, and starter circuits of an automotive vehicle, the combination of: spaced apart stationary supply and ignition contacts; a stationary accessory contact fixed with respect to the supply and ignition contacts and spaced a distance to one side of a line joining the contact faces thereof; a contactor rotatable from a switch off position to a first switch on position engaging said supply, ignition, and accessory contacts to render the ignition and accessory circuits operative, said contactor being tiltable upon the contact faces of said supply and ignition contacts about an axis passing through the points of engagement between said contacts and the contactor, to a second switch on position disengaged from the accessory contact to break the circuit controlled thereby while remaining in engagement with said supply and ignition contacts to maintain the ignition circuit operative; means acting on the contactor to yieldingly resist tilting thereof to said second switch on position; a starter contact fixed with respect to said supply and ignition contacts but spaced to one side of said axis about which the contactor tilts and in position to be engaged by the contactor and electrically connected with the supply contact by said contactor when the latter is tilted to said second switch on position; and an actuator for imparting rotative and tilting movement to said contactor.

5. The switch set forth in claim 2 further characterized by the provision of detent means defining said first switch on position of the contactor, said detent means including a spring for yieldingly resisting rotation of the contactor out of said first switch on position and for yieldingly resisting tilting of the contactor to its second switch on position.

6. The switch set forth in claim 5 further characterized by the provision of an accessory contact fixed with respect to said supply and ignition contacts and in position to be engaged by the movable contactor in the first switch on position thereof to be electrically connected with the supply contact by the contactor, said accessory contact being so related to the starter contact that the contactor is disengaged from the accessory contact upon tilting of the contactor to its second switch on position.

7. In a combined ignition and starter switch for automotive vehicles: a housing; switch instrumentalities inside the housing at the rear thereof including a plurality of spaced apart stationary contacts and a movable contactor cooperable with said stationary contacts; an actuator rotatable within said housing at the front thereof and slidable endwise rearwardly of the housing; a rotation transmitting connection between the actuator and the contactor by which the contactor may be moved from a switch off position to a first switch on position engaging two of said stationary contacts, said connection permitting tilting of the contactor upon the contact faces of said two contacts about an axis passing through the points of engagement between them and the contactor, to a second switch on position of the contactor; means on the actuator engaged with the contactor upon endwise rearward sliding motion of the actuator to effect tilting of said contactor to its second switch on position; another stationary contact fixed with relation to the first designated contacts and in position to be engaged by the contactor when the same is tilted to its second switch on position; and means for yieldingly resisting tilting of the contactor to said second switch on position thereof.

8. In a combined ignition and starter switch for automotive vehicles: a housing; switch instrumentalities inside the housing at the rear thereof including a plurality of spaced apart stationary contacts and a movable contactor cooperable with said stationary contacts; an actuator rotatable within said housing at the front thereof and slidable endwise rearwardly of the housing; a rotation transmitting connection between the actuator and the contactor by which the contactor may be moved from a switch off position to a first switch on position engaging two of said stationary contacts, said connection permitting tilting of the contactor upon the contact faces of said two contacts about an axis passing through the points of engagement between them and the contactor, to a second switch on position of the contactor; a pusher arm connected with the actuator to slide endwise therewith and engageable with the contactor at a point to one side of said tilt axis to tilt the contactor to its second switch on position upon rearward depression of the actuator into the housing; another stationary contact positioned on the other side of said tilt axis and fixed with relation to said first designated contacts in a position to be engaged by the contactor when the same is tilted to its second switch on position; and means for yieldingly resisting tilting of the contactor to said second switch on position thereof.

9. In a combined ignition and starter switch for automotive vehicles: a housing; switch instrumentalities inside the housing at the rear thereof including a plurality of spaced apart stationary contacts and a movable contactor cooperable with said stationary contacts; an actuator rotatable within said housing at the front thereof and slidable endwise rearwardly of the housing; a rotation transmitting connection between the actuator and the contactor by which the contactor may be moved from a switch off position to a first switch on position engaging three of said stationary contacts, said connection permitting tilting of the contactor upon the contact faces of two of said contacts about an axis passing through the points of engagement between said two contacts and the contactor, to a second switch on position of the contactor at which it is disengaged from the third contact; means on the actuator engaged with the contactor upon endwise sliding motion of the actuator toward the stationary contacts to effect tilting of said contactor to its second switch on position; a fourth stationary contact fixed with respect to the remaining contacts and located to one side of said tilt axis to be engaged by the contactor when the same is tilted to its second switch on position; and means for yieldingly resisting tilting of the contactor to said second switch on position thereof.

10. In a switch for controlling the ignition, accessory, and starter circuits of an automotive vehicle, the combination of: spaced apart stationary ignition and supply contacts; a contactor rotatable from an off position to a first switch on position bridging said ignition and supply contacts, said contactor being tiltable on said ignition and supply contacts to a second switch on position; spring means acting on said contactor to yieldingly resist tilting thereof to its second switch on position and for tilting the contactor back to its first switch on position; stationary accessory and starter contacts spaced apart from one another in the direction of tilting motion of a portion of the contactor remote from the tilt axis thereof and lying at opposite sides of said portion of the contactor, the accessory contact being located to be engaged by the contactor in its first switch on position, and the starter contact being located to be engaged by the contactor in its second switch on position; and an actuator for imparting rotative and tilting motion to said contactor.

11. In a switch for controlling the ignition, accessory, and starter circuits of an automotive vehicle, the combination of: spaced apart stationary supply, ignition and accessory contacts; a contactor cooperable with said contacts and rotatable in one direction from a switch off position to an accessory on position engaging only the accessory and supply contacts, and being rotatable in the opposite direction from said off position thereof to a running position engaging the ignition contact as well as the accessory and supply contacts, said contactor being tiltable away from said accessory contact in the running position of the contactor about an axis passing through the points of engagement between it and the ignition and supply contacts; a stationary starter contact in position to be engaged by the contactor in its tilted condition and electrically connected thereby with the supply contact; a rotable and axially movable actuator for imparting rotative and tilting movement to said contactor; and spring means acting on said contactor to return the same to its running position from its tilted position engaging said starter contact.

12. The switch set forth in claim 11 further characterized by the provision of means for precluding axial movement of the actuator except upon rotation thereof to the running position of the contactor.

13. In a switch for controlling the ignition and starting circuits of an automotive vehicle, the combination of: a housing structure; stationary supply, ignition, and starter contacts carried by the housing structure; an actuator mounted on said housing structure for rotary motion and for back and forth motion on its axis of rotation; a contact carrier inside said housing structure movable from a switch off position to a first switch on position, and movable from said first switch on position to a second switch on position; a bridging contactor mounted on said carrier and having contact engaging portions thereon, all substantially fixed with respect to one another and bodily movable with the carrier, and arranged to electrically connect said ignition and supply contacts in the first switch on position of the carrier, and to electrically connect both the ignition and starter contacts with the supply contact in the second switch on position of the carrier; a first motion transmitting connection between the actuator and the carrier by which the latter and the contactor thereon are moved back and forth between said switch off and first switch on positions thereof in consequence to rotation of the actuator; a second motion transmitting connection between the actuator and the carrier established upon movement of the carrier to its first switch on position for effecting motion of the carrier from its first to its second switch on position in consequence to axial motion of the actuator in one direction; and spring means for effecting return of said carrier, and the contactor thereon, to the first switch on position of the carrier from the second position thereof.

14. In a switch for controlling the ignition and starting circuits of an automotive vehicle, the combination of: a housing structure; stationary supply, ignition and starter contacts carried by said housing structure; an actuator mounted on the housing structure for rotary motion and for back and forth motion on its axis of rotation; a contact carrier inside the housing structure movable from a switch off position to a first switch on position, and movable from said first switch on position to a second switch on position; a bridging contactor mounted on said carrier and having contact engaging portions thereon cooperable with said stationary contacts and all substantially fixed with respect to one another and movable bodily with the carrier, said contact engaging portions of the contactor being arrange to electrically connect said ignition and supply contacts in the first switch on position of the carrier, and to electrically connect both the ignition and starter contacts with the supply contact in the second switch on position of the carrier; a first motion transmitting connection between the actuator and the carrier by which the carrier is moved back and forth between its switch off and first switch on positions in consequence to rotation of the actuator; a second motion transmitting connection between the actuator and the carrier established upon motion of the carrier to its first switch on position and comprising a member movably mounted on the housing structure and engageable with a part on the carrier in the first switch on position thereof, and a connection between the actuator and said member providing for rotation of the actuator relative thereto and by which axial motion of the actuator in one direction is translated by said member into motion of the carrier from its first to its second switch on position; and spring means for effecting return of said carrier, and the contactor thereon, to the first switch on position of the carrier from the second switch on position thereof.

EDWARD N. JACOBI.

REFERENCES CITED

The following references are of record in the file of this patent:

UNITED STATES PATENTS

| Number | Name | Date |
|---|---|---|
| 2,060,951 | Rae | Nov. 17, 1936 |
| 2,519,758 | Heidman | Aug. 22, 1950 |
| 2,520,363 | Heidman | Aug. 29, 1950 |